United States Patent [19]

Noguchi et al.

[11] Patent Number: 4,903,183
[45] Date of Patent: Feb. 20, 1990

[54] POWER SUPPLY FOR A MAGNETRON

[75] Inventors: Syouichi Noguchi, Shirako; Kunio Ishiyama; Teruaki Odaka, both of Mobara, all of Japan

[73] Assignee: Hitachi, Ltd., Tokyo, Japan

[21] Appl. No.: 258,478

[22] Filed: Oct. 17, 1988

[30] Foreign Application Priority Data

Oct. 21, 1987 [JP] Japan .................................. 62-263821
Mar. 11, 1988 [JP] Japan .................................. 63-56086

[51] Int. Cl.[4] ....................... H02M 3/335; H05B 6/80
[52] U.S. Cl. ......................................... 363/21; 363/95; 219/10.55 B; 315/106
[58] Field of Search ..................................... 363/18–21, 363/95, 131; 219/10.55 B; 315/105, 106, 107; 328/253, 270

[56] References Cited

U.S. PATENT DOCUMENTS

| 3,973,165 | 8/1976 | Hester | 219/10.55 B |
| 4,012,617 | 3/1977 | Burke et al. | 219/10.55 B |
| 4,023,004 | 5/1977 | Burke | 219/10.55 B |
| 4,318,165 | 3/1982 | Kornrumpf et al. | 363/21 |
| 4,672,159 | 6/1987 | Nilssen | 363/98 |

FOREIGN PATENT DOCUMENTS 52-79345  7/1977  Japan .
62-107396 7/1987  Japan .

Primary Examiner—Peter S. Wong
Attorney, Agent, or Firm—Antonelli, Terry & Wands

[57] ABSTRACT

In a magnetron power supply for obtaining a high voltage for an anode by an inverter circuit, there is disclosed the improvement including a detector for detecting an AC output current of a secondary-side high voltage winding of a transformer instead of detecting an anode current (after being rectified) for the magnetron to control a magnetron output to a desired value. In this constitution, a current value is detected by clipping a positive or negative side of an output of the detector.

2 Claims, 8 Drawing Sheets

FIG. 3(a) State of Switching Element 30

FIG. 3(b) Current through Secondary Winding of Current Transformer 60

FIG. 3(c) Detected Voltage by Detection Circuit 100

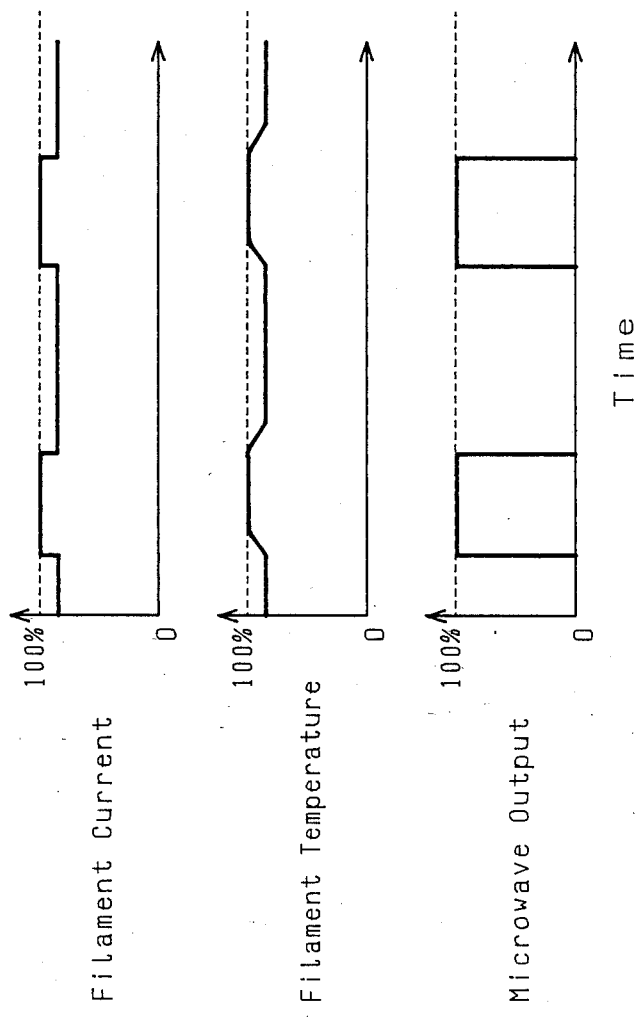

POWER SUPPLY FOR A MAGNETRON

BACKGROUND OF THE INVENTION

The present invention generally relates to a power supply for a magnetron suited to a microwave oven, in which its current source unit is miniaturized to reduce the weight, and an output control unit is also diminished in size for simplification in order to decrease the costs, and more particularly, to a magnetron power supply wherein a life span of a cathode (filament) of the magnetron is not shortened even when the output of magnetron is varied in a wide range including an intermittent stoppage.

In a method of stepping up a voltage of a commercial AC frequency with a transformer and rectifying it for the purpose of obtaining high DC voltages to be impressed on an anode of the magnetron which generates a high frequency for a microwave heater, the transformer tends to be bulky and heavy. In recent years, there has been utilized a high frequency heater using a so-called inverter system power supply which is arranged in such a way that a commercial alternating voltage is rectified to obtain a direct voltage, and the direct voltage is inverted into a higher frequency voltage than the commercial AC frequency by opening and closing a switching element preparatory to be stepped up by a transformer which can be small both in size and in weight, and a high DC voltage obtained by rectifying this alternating voltage once again is impressed on the anode of the magnetron. In accordance with the inverter system power supply, it is possible to readily control the output with a high efficiency by controlling an ON/OFF time ratio (duty ratio) of the switching element.

A prior art high frequency heater using the inverter system power supply is disclosed in, e.g., Japanese Patent Laid-Open Publication No. 79345/1977. This type of high frequency heater incorporates an anode current detector for detecting an anode current of the magnetron and a duty control unit for controlling an opening/closing duty ratio of the switching element in accordance with a signal transmitted from the anode current detector.

In the case of the high frequency heater for use with a microwave oven or the like, in the great majority of cases, an AC high voltage output across a secondary winding of the transformer are employed as an anode voltage source of the magnetron by converting the output into a direct voltage by means of a half-wave or full-wave voltage doubler rectifier circuit composed of a combination of diodes and a capacitor. Where a magnetron anode current value of such a circuit is detected on the basis of the above-described conventional technique, a current value sharply fluctuates in time despite of being the direct current. Hence there is typically employed such a current transformer that it is relatively easy to establish the insulation between the high voltage circuit to be measured and the current value detecting circuit, and a loss in electric power is small.

The magnetron anode current flowing on the primary-side of the current transformer has already been, however, rectified and become a unidirectional current. Therefore, a core section has to be sufficiently large so as not to saturate the core forming a magnetic circuit of the current transformer. This arrangement is especially necessary when employing the full-wave rectifier circuit.

On the part of the current value detecting circuit, since no DC component is present in the output of the current transformer, a zero-level adjustment has to be performed by means of a DC restoration circuit, which leads to an increment in the number of components.

FIG. 1 is a circuit diagram schematically illustrating one example of the conventional high frequency heater in which the high frequency given by the inverter system power supply serve as the inputs of the transformer, and the half-wave voltage doubler rectifier circuit is employed on the secondary-side of the transformer. The reference numeral 1 designates a commercial AC power supply; 10 represents a rectifier circuit; 20 denotes a transformer; 30 stands for a switching element; 31 is a driving circuit; 40 a capacitor; 50 a diode; 60 a current transformer; 70 a voltage comparator for comparing an output voltage of a current value detecting circuit 90 for detecting an electric current to a magnetron with a reference voltage value which is preset corresponding to a desired output; 80 a magnetron; 81 a heater current source for the magnetron; R1 to R5 resistances; D1 a diode; Q1 and Q2 transistors; and C1 represents a capacitor. If the current transformer is used as detecting means, though a measurement object is the rectifier magnetron anode current (direct current), no DC component is present in the output, i.e., the electric current of the current value detecting circuit. For this reason, after effecting the zero-level adjustment by the DC restoration circuit, the anode current has to be detected by clipping it with the diode D1. As a result, the circuit requires a good number of components including Q2, R4, C1 and so on.

The current flowing on the primary-side of the current transformer is a pulsating, but unidirectional direct current. Hence, the section of the magnetic circuit of the current transformer has to be large so that no magnetic flux is saturated and magnetic flux interlinking with a secondary winding varies sufficiently. For this reason, the core of the current transformer becomes large for the output, and it follows that the transformer is heavy and large in size. This brings about an increase in cost.

The output voltage of the current value detecting circuit is compared with the reference voltage value which is preset corresponding to the desired magnetron anode current value by means of the voltage comparator 70. If there flows an electric current whose current value is higher than the desired value, the driving circuit 31 is controlled by the output of the voltage comparator 70 to decrease a duty ratio of the switching element. If it is smaller than the desired value, however, the driving circuit 31 is controlled to increase the duty ratio. Videlicet, the driving circuit 31 and the voltage comparator 70 are combined to form a control circuit for the switching element 30.

In case of using the conventional magnetron power supply for obtaining a high anode voltage of the magnetron by use of a commercial frequency transformer, the output of the magnetron has heretofore been adjusted by intermittently disconnecting the voltage source. However, if a cathode filament of the magnetron is turned on and off, especially when decreasing the cycle of intermittent operations, a life span of the filament is outstandingly diminished. In general, a transformer for the filament is separately provided to constantly heat the filament. The commercial frequency transformer is heavy and large. To cope with this, as disclosed in, e.g., Japanese Utility Model Laid-Open Publication No. 107396/1987, there has recently been developed a light-weight inverter system magnetron power supply constructed in such a manner that the direct voltage obtained by rectifying a commercial frequency voltage is converted into a higher frequency voltage by using the switching element; the transformer is diminished both in weight and in configuration by employing an inverter circuit for inverting the direct voltage into an alternating voltage having a high frequency than the commercial frequency; and simultaneously the microwave output of the magnetron is adjusted by varying an opening/closing time ratio of the switching element.

The above-described prior art aims at applying the magnetron to the high frequency heating in a microwave oven or the like. This purpose is accomplished either by controlling the microwave output given to the materials to be heated on the basis of the intermittent operations at intervals of several ten seconds by use of the commercial frequency voltage source or by controlling the microwave output changing the opening/closing time ratio of the switching element by use of the inverter system power supply.

Excepting the microwave oven, a microwave generating device which employs the magnetron includes industrial devices such as a plasma etching device, a stroboscope type high luminance light emitting device, a fine spot heating device in semiconductor processing. Some of these devices require high-speed switching of the output in addition to precisely controlling the microwave output value.

A power supply designed for switching only the high anode voltage of the magnetron has already been put into a practical use, wherein the filament transformer is separately provided. This type of power supply is, however, large in size and expensive.

SUMMARY OF THE INVENTION:

It is a primary object of the present invention, which obviates such problems inherent in the prior art inverter system magnetron power supply that the current detecting means is large both in size and in weight and a good number of components for the current values detecting circuit are needed, to provide a novel magnetron power supply using small-sized and light-weight current detecting means and a current value detecting circuit which is simplified in configuration and requires a small number of components.

To this end, according to one aspect of the invention, there is provided a magnetron power supply capable of intermitting the microwave output at a high speed as well as of controlling a magnitude of the microwave output.

To eliminate the above-described problems, according to another aspect of the invention, there is provided a magnetron power supply characterized in that for obtaining a desirably controlled output of a magnetron there is provided means for detecting an AC output current of a high voltage secondary winding of a transformer instead of detecting an anode current (after being rectified) of the magnetron; and a clipping porcess effected on the positive or negative side of the output of this detecting means, thereby simplifying the construction and decreasing the number of components of the current value detecting circuit.

With a view to solving the above-described problems, according to still another aspect of the invention, there is provided a magnetron power supply comprising: an inverter circuit for inverting a direct voltage obtained by rectifying a voltage of a commercial frequency into an alternating voltage having a higher frequency than the commercial frequency by opening/closing operations of a switching element; a transformer for obtaining high voltage output for an anode and a low voltage output for a filament for a magnetron on the secondary-side by inputting said alternating voltage into a primary winding; and a control circuit for controlling time for an opening/closing state of the switching element. Based on this construction, the adjustment of the microwave output of the magnetron, which includes not only a magnitude adjustment, but also intermittent operation adjustment, is effected only by changing the opening/closing time ratio of the switching element. The electric power continues to be supplied to the primary-side of the transformer even when the microwave output is off. More specifically, when an open-circuit period of the switching element of the inverter circuit relatively increases, and a closed-circuit period relatively decreases, a value of high voltage impressed on the anode of the magnetron decreases to a certain critical value, no anode current flows, and microwave output is off. The high-speed intermittent operations of the microwave output can thus be carried out simply by varying the opening/closing time ratio of the switching element of the inverter circuit.

Other objects and advantages of the invention will become apparent during the following discussion with reference to the accompanying drawings.

BRIEF DESCRIPTION OF THE DRAWINGS:

FIG. 8 is an explanatory diagram illustrating the function of the embodiment.

DETAILED DESCRIPTION OF THE PREFERRED EMBODIMENTS:

In accordance with the present invention also, as detecting means for detecting an electronic current of a high voltage circuit, there is employed a current transformer capable of facilitating the insulation between a primary circuit and a secondary circuit and arbitrarily determining a voltage reference point (e.g., an earth point) on the secondary-side. However, because the current flowing on the primary side of the current transformer is an alternating current, the necessity for considering the saturation of a magnetic circuit of the current transformer is eliminated, and the small-sized and light-weight current transformer can be utilized.

In this case, as a matter of course, an AC voltage is generated on the secondary-side of the current transformer. However, if the positive or negative side of the output is clipped by connecting diodes respectively to both ends of a secondary winding, the current value detecting circuit can be simplified.

An anode current of a magnetron sharply varies due to relatively small fluctuations in voltage impressed on the anode, and ceases to flow when the value of voltage impressed on the anode is lower than a certain critical value. As a result, no microwave output can be obtained. This critical value is considerably great, and even when the microwave output current is off, a considerable voltage is still impressed on a cathode filament. Namely, the microwave output is stopped in a state even when the filament heating voltage is not so small.

It is therefore feasible to perform the high-speed intermittent operations of the microwave output simply by varying an opening/closing time ratio of a switching element of an inverter circuit. In this case, variations in the filament heating condition of the magnetron are not so large, and there is no problem if the transformer for heating the cathode is not provided separately.

Figure 2:
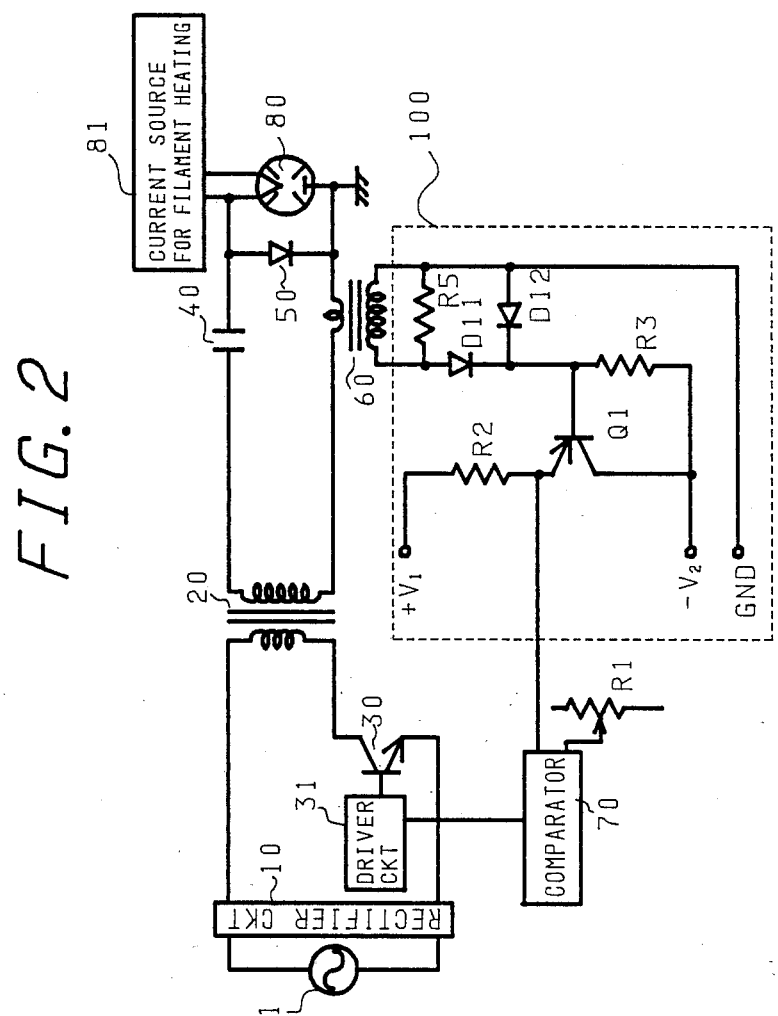
FIG. 2 is a diagram illustrating one embodiment of the present invention.

FIG. 2 is a diagram illustrating one embodiment of the present invention. A current transformer generally designated at 60 is connected to a position closer to a transformer 20 than diode 50 so that an AC output current of a high voltage secondary winding of the transformer 20 can be measured. For this reason, the alternating current flows through a primary winding of the current transformer 60 (in such a transformer for measurement, ampere turns of the primary winding are remarkably greater than those of the secondary winding and a condition of magnetic flux of a magnetic circuit is determined by the primary-side ampere turns), and hence the anxiety for saturation of a magnetic circuit core is eliminated. Furthermore, as compared with the conventional device for detecting the rectified magnetron anode current, the current transformer is small both in weight and in configuration.

In a current value detecting circuit 100, diodes 11 and 12 are connected to both ends of a secondary winding of the current transformer, and the negative side of the output voltage is clipped. A DC restoration circuit is omitted, thus simplifying the constitution.

Figure 1:
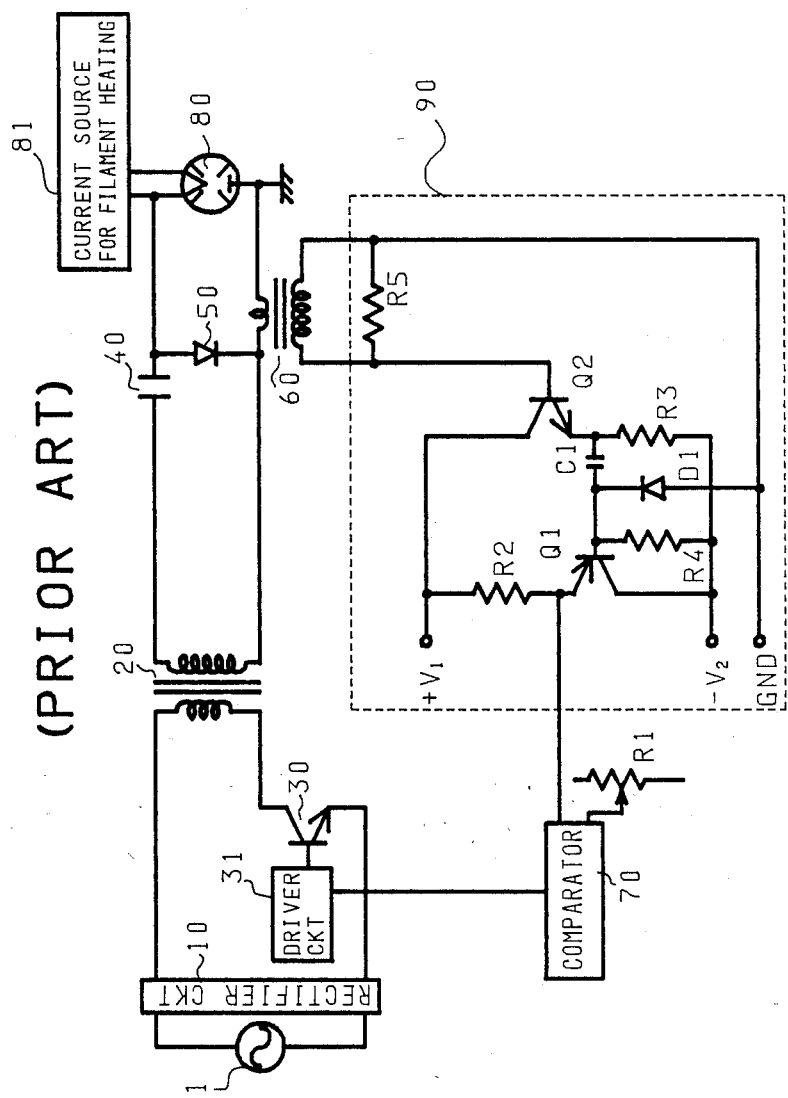
FIG. 1 is a circuit diagram schematically illustrating one example of a conventional high frequency heater based on an inverter system power supply.

The reference symbols and the functions of components other than the above-described ones are the same as those in FIG. 1.

Figure 3:
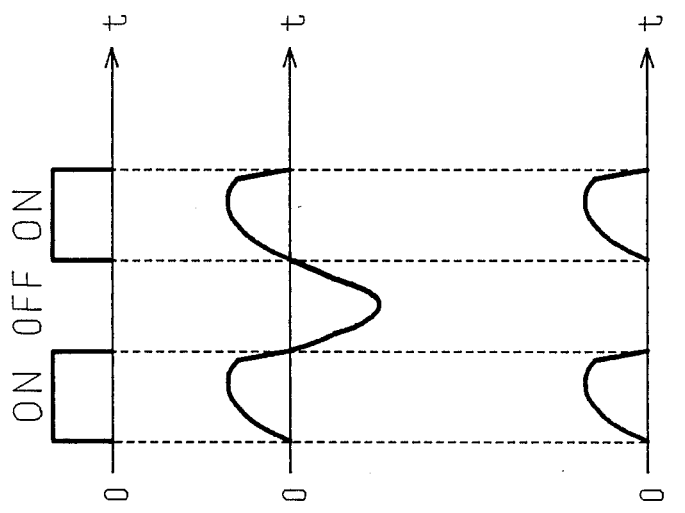
FIGS. 3(a) to 3(c) are diagrams for explaining the function of the embodiment shown in FIG. 2.

FIG. 3 is a diagram of assistance in explaining the function of the embodiment shown in FIG. 2. FIG. 3(a) shows ON/OFF operations of the switching element 30. An OFF period is substantially constant because of an inductance of windings of which the circuit is composed and a capacity of an unillustrated capacitor for resonance (however, a crest value increases as the output augments). The output control is effected mainly by controlling an ON period. FIG. 3(b) illustrates an electric current of the secondary winding of the current transformer. FIG. 3(c) shows a detected voltage of the current value detecting circuit.

Figure 4:
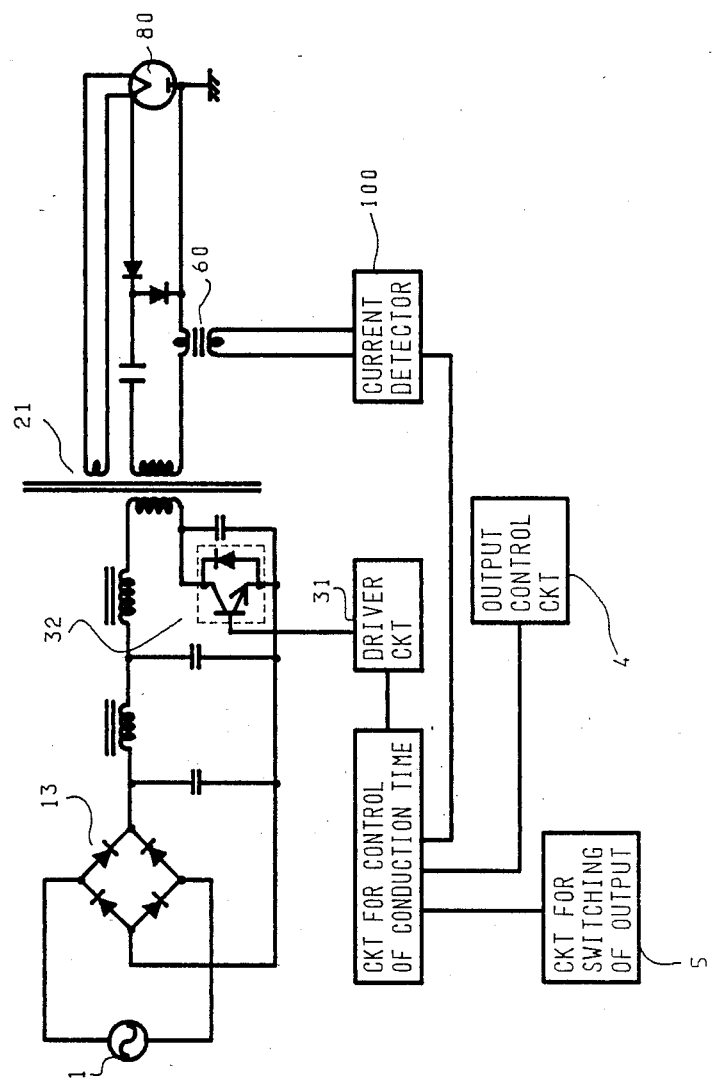
FIG. 4 is a diagram illustrating one embodiment of the present invention.

FIG. 4 illustrates another embodiment of the present invention. Referring to FIG. 4, the numeral 21 designates a high frequency transformer including an anode high voltage winding and a filament low voltage winding of the magnetron; 32 denotes a switching element; 13 represents a rectifier; 4 stands for an output adjusting circuit capable of performing the adjustment ranging from a microwave output off state to a maximum output state by varying the opening/closing time ratio of the switching element of the inverter circuit; 5 indicates an intermittent operation circuit for determining a microwave output time and an off time during the intermittent operation; and 80 represents a magnetron.

Figure 5:
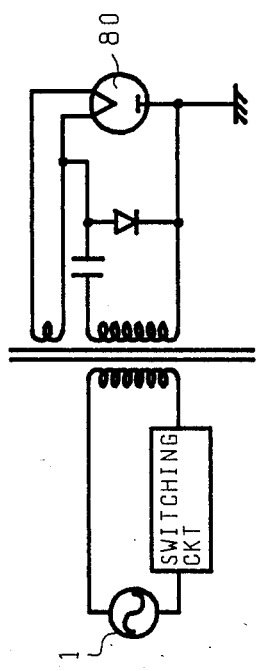
FIG. 5 is a diagram for explaining a conventional technique.
Figure 6:
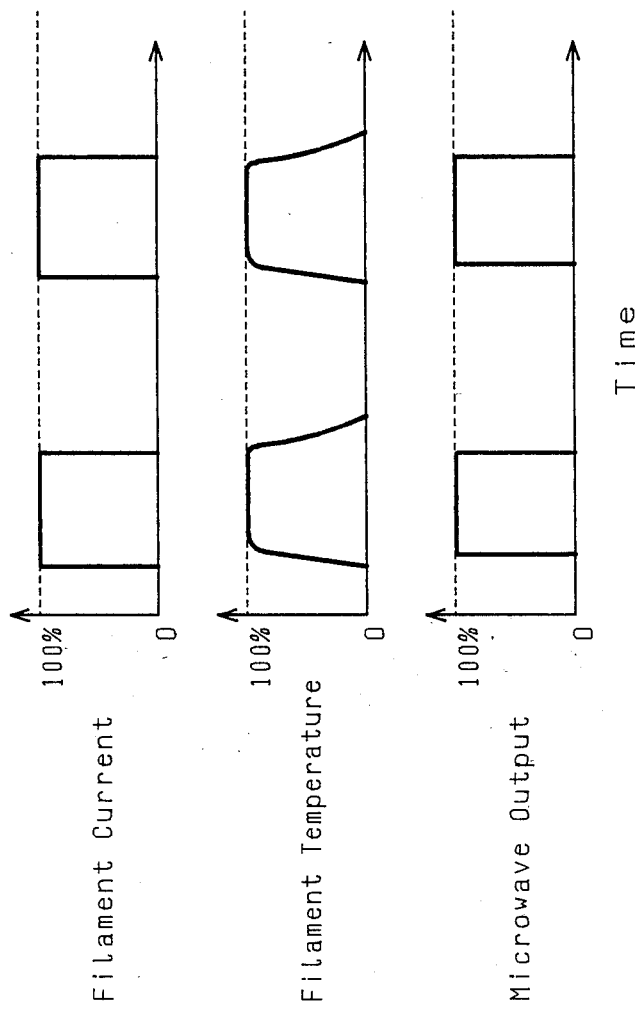
FIG. 6 is an explanatory diagram showing the function in the conventional example.

Turning attention to FIG. 5, there is illustrated a circuit for adjusting the microwave output by intermitting the supply of electric power on the primary-side. In this method, when the primary-side is on, the magnetron works, thereby generating the microwave output. When the primary-side is off, the magnetron does not function. In this method, as depicted in FIG. 6, the filament of the magnetron is also brought into an energized state or a non-energized state, and hence a filament temperature greatly fluctuates. If the filament temperature is repeatedly varied so many times, a life span of the filament, viz., the life span of the magnetron is outstandingly reduced. Generally, the filament of the magnetron is so manufactured that a certain minimum of ON/OFF operations of the filament is assured under given quality conditions. If the number of intermittent operations is large, the life span is diminished due to thermal cycles of the filament. For such a reason, the intermittent operation period is approximately 10 sec at least in the method of providing the filament winding and the high voltage winding in the same transformer. If the intermittent operation is executed in a shorter period than 10 sec, the number of cycles increases, resulting in a decrease in life span. Hence, even when intermitting the microwave output, the filament has to be kept on with another transformer provide for a filament.

Figure 7:
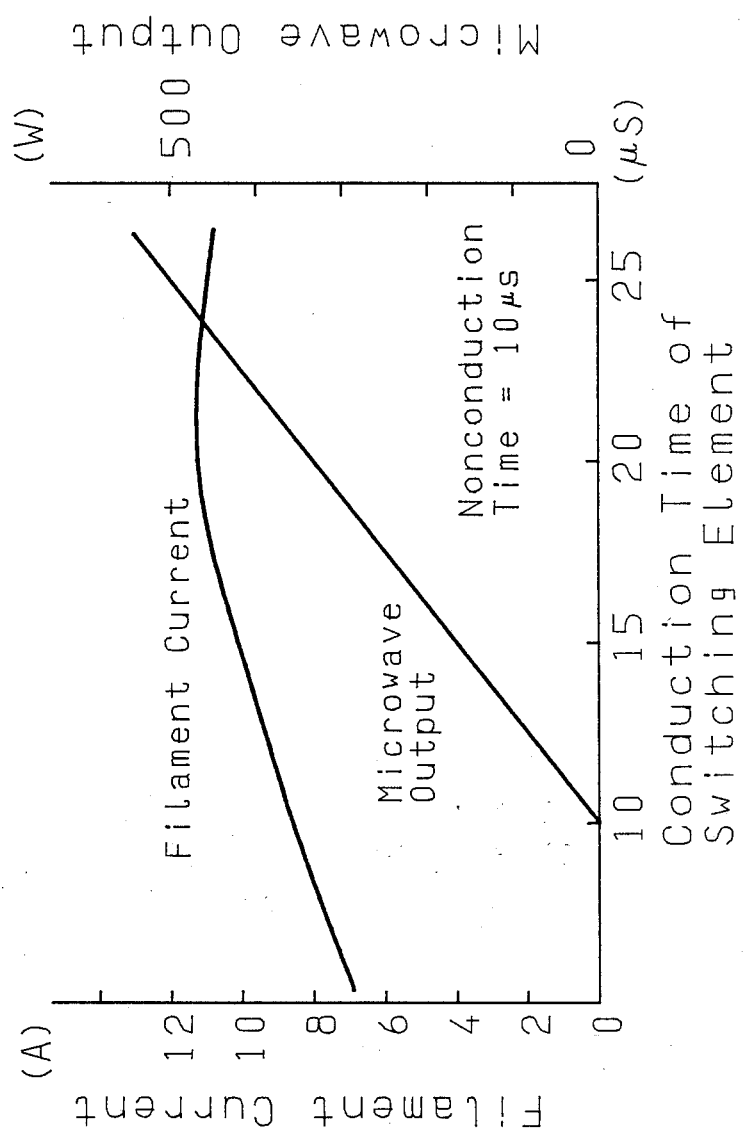
FIG. 7 is a characteristic diagram showing the embodiment of the present invention.

In accordance with the embodiment shown in FIG. 4, the characteristics shown in FIG. 7 (the numerical values in the Figure are written therein as an example, and are not limitative) can be obtained by varying the conduction time of the switching element of the inverter circuit. When the conduction time of the switching element is 25 $\mu$s, an output of 500 W is acquired. According as the conduction time is shortened, the output is reduced. When the conduction time is 10 $\mu$s, the output becomes 0. The output voltage of the transformer at this time merely decreases under a voltage (in this example, about 3.8 kV determined by geometry of the magnetron) at which the operation of magnetron is initiated, and which is not so low. On the other hand, since the filament current of the magnetron is substantially proportional to the filament voltage, even when the anode voltage of the magnetron is lowered under the operation initiating voltage, the filament current of a considerable magnitude flows.

Under such circumstances, the conduction time of the switching element is adjusted to obtain a desired microwave output, or alternatively reduced till the high voltage output of the transformer decreases below the voltage at which the operation of magnetron starts and the microwave output ceases. By such processes, it is possible to perform such intermittent operations depicted in FIG. 8 that the variations in temperature of the filament are minimized and the life span of the magnetron is not thereby diminished at all. Consequently, in the conventional method of adjusting the microwave output by intermitting the input on the primary winding of a transformer for the commercial frequency the intermittent operation of a period within 10 sec can not be attained. According to the present invention, however, the intermittent operation of a period within 1 sec can sufficiently be performed.

As discussed above, in accordance with the present invention, it is feasible to obtain an inexpensive magnetron power supply in which the current transformer for detecting the input current to the magnetron may be small both in size and in weight, and the current value detecting circuit connected to the secondary-side of the current transformer can be simplified.

According to the present invention, in an inverter circuit-based magnetron power supply, the intermittent operation of a period within 1 sec can be attained, the microwave output can be continuously varied, and a desired intermittent operation associated with a desired microwave output can also be effected. Thus, it is possible to obtain a small-sized and light-weight magnetron power supply with high performance which can correspond to any cooking conditions required in a microwave oven or to any industrial working conditions.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or the spirit of the invention.

What is claimed is:

1. In a power supply for a magnetron in which a direct current obtained by rectifying a voltage of a commercial AC frequency is inverted into an alternating voltage of a higher frequency than said commercial frequency by a switching element and is inputted to a primary-side of a transformer, and an output of a secondary-side high voltage winding of said transformer is applied to an anode of said magnetron after rectifying said output, the improvement comprising detecting means for detecting an AC output current of said high voltage secondary winding of said transformer, whereby a signal obtained by clipping a positive or negative side of an output of said detecting means is imparted to a control circuit of said switching element, and an electric current to said magnetron is controlled to a desired preset value, said detecting means for detecting said high voltage AC output current of said transformer including a current transformer, and said positive or negative side of said output being clipped by diodes connected to both ends of an output winding of said current transformer.

2. In a power supply for a magnetron including an inverter circuit for inverting a direct voltage obtained by rectifying a voltage of a commercial frequency into an alternating voltage of a higher frequency than said commercial frequency on the basis of opening/closing operations of a switching element, a transformer for obtaining a high voltage output for an anode and a low voltage output for a filament for said magnetron on a secondary-side by inputting said alternating voltage into a primary winding, and control circuit means for controlling a time associated with an opening/closing state of said switching element, the improvement comprising:

said control circuit means including means for adjusting a magnitude and an ON-OFF state of a microwave output of said magnetron by varying an opening/closing time ratio of said switching element, the electric power continuing to be supplied to a primary-side of said transformer even when stopping said microwave output; and detecting means for detecting an AC output current of a secondary-side high voltage winding of said transformer, whereby a signal obtained by clipping a positive or negative side of an output of said detecting means is imparted to said control circuit means of said switching element, and an electric current to said magnetron is controlled to a desired preset value, said detecting means for detecting said high voltage AC output current of said transformer including a current transformer, and said positive or negative side of said output being clipped by diodes connected to both ends of an output winding of said current transformer.

* * * * *